Nov. 22, 1966          J. E. HOLCOMB          3,287,682

CORE INSULATION FOR PROTECTION AGAINST IMPULSE VOLTAGE

Filed May 18, 1960          4 Sheets-Sheet 1

Inventor,
James E. Holcomb,
by Francis X. Doyle
His Attorney.

Nov. 22, 1966    J. E. HOLCOMB    3,287,682
CORE INSULATION FOR PROTECTION AGAINST IMPULSE VOLTAGE
Filed May 18, 1960    4 Sheets-Sheet 2

Inventor,
James E. Holcomb,
by Francis X. Doyle
His Attorney.

Nov. 22, 1966   J. E. HOLCOMB   3,287,682
CORE INSULATION FOR PROTECTION AGAINST IMPULSE VOLTAGE
Filed May 18, 1960   4 Sheets-Sheet 3

Inventor,
James E. Holcomb,
by Francis K. Doyle
His Attorney.

Nov. 22, 1966        J. E. HOLCOMB        3,287,682
CORE INSULATION FOR PROTECTION AGAINST IMPULSE VOLTAGE
Filed May 18, 1960        4 Sheets-Sheet 4
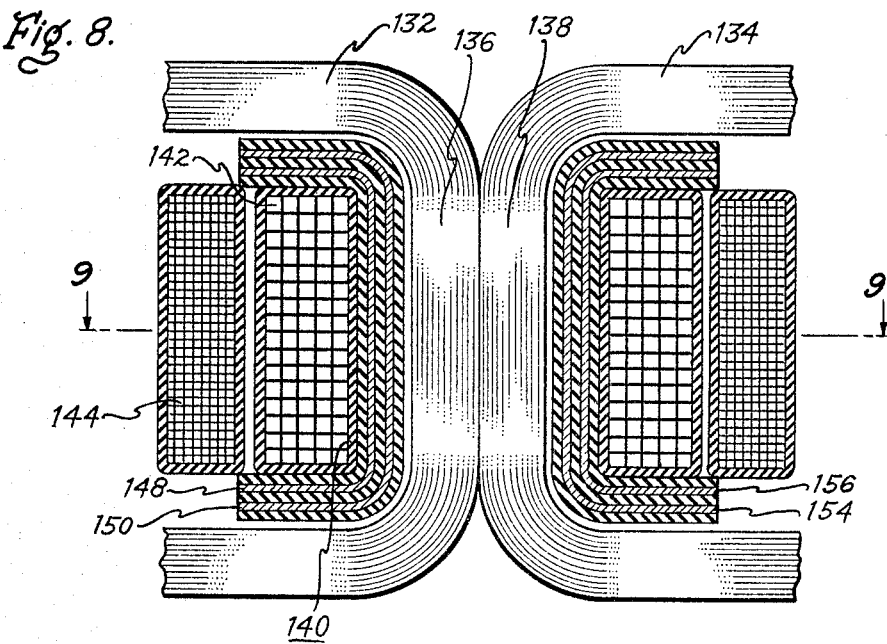
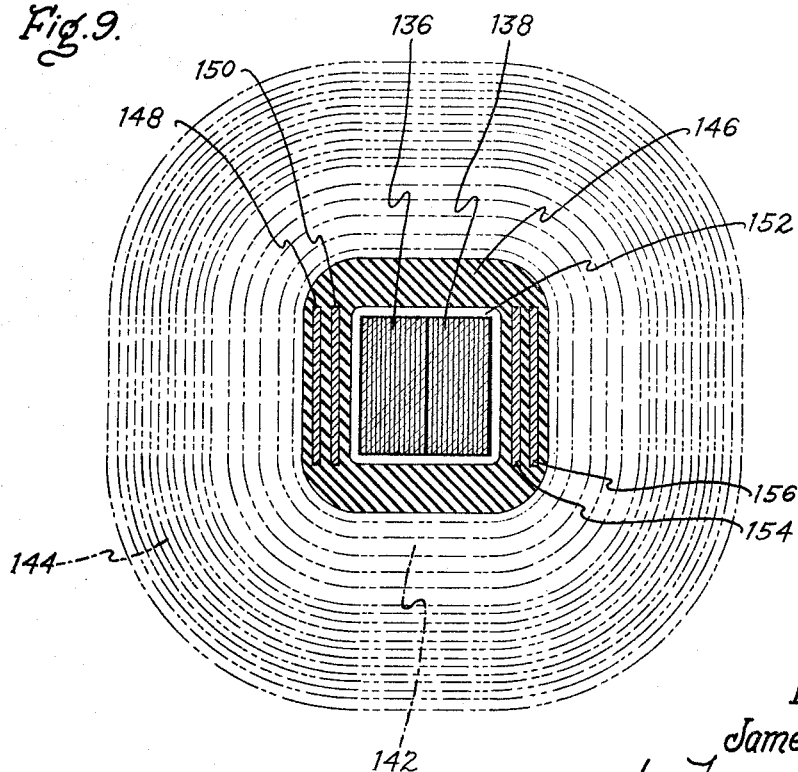
Inventor,
James E. Holcomb,
by Francis K. Doyle
His Attorney.

3,287,682
CORE INSULATION FOR PROTECTION AGAINST IMPULSE VOLTAGE
James E. Holcomb, Lanesboro, Mass., assignor to General Electric Company, a corporation of New York
Filed May 18, 1960, Ser. No. 29,896
7 Claims. (Cl. 336—219)

This invention relates to stationary electrical induction apparatus such as transformers and the like, and, more particularly, to an improved core and coil structure for stationary electrical induction apparatus.

In stationary electrical induction apparatus, such as transformers and the like, provided with coil and core structures wherein the core is formed of a number of laminations of magnetic material, it has been found necessary to insulate each of the laminations forming the core from each other, to reduce the eddy current losses in the core. These eddy current losses are generally considered as the core losses of the stationary electrical induction apparatus. It is well known that when the electrical winding of stationary electrical induction apparatus is subjected to high impulse voltages such as, for example, during impulse testing or due to lightning and switching surges, the core losses of the stationary electrical induction apparatus are increased a substantial amount. Such increases may be of the order of 30–40%. During these high voltage impulse conditions the stresses which are induced into the magnetic core of the stationary electrical induction apparatus are much greater than those which are encountered when the apparatus is operating under its normal operating conditions. It has generally been considered that the increase in core losses, due to the high impulse voltage conditions, are due to an increase in the electrostatically induced voltage, as well as an increase in the electromagnetically induced voltages. Further, the belief has been that the electromagnetically induced voltages generally apply electromagnetically induced stresses uniformly to the various laminations of the core across the entire core. Therefore, in some instances it has been the practice to increase the interlaminar insulation between each of the laminations of the core to a strength such that it would be enabled to withstand the impulse condition.

As a general rule, the design of the stationary electrical induction apparatus is dictated by the normal operation conditions under which the apparatus will be utilized. In these instances, the interlaminar insulation between the various laminations of the core can be damaged by the high impulse conditions to which the stationary electrical induction apparatus may be subjected. The general effect of damaging the interlaminar insulation has been an increase in the eddy current losses of the transformer. As noted above, this increase in the current losses or in the transformer core losses, may be of the order of 30–40%. Of course, it is understood that by normal operating condition it is meant the commercial voltages and frequency to which the stationary induction apparatus is most generally applied. In the United States, the most widely used commercial frequency is 60 cycles per second while on the European continent, 25 and 50 cycles per second are the frequencies most widely used. It will be further understood that during high impulse voltage conditions, such as impulse testing or lightning or switching surges, the stationary induction apparatus is subjected to transient voltages which are of very high magnitude and have a very rapid rate of change.

It will be well understood by those skilled in this art that the increase in the interlaminar thickness between the various laminations of the core, in order to provide sufficient insulation to prevent interlaminar breakdown during high impulse conditions, will increase the core build of the stationary electrical induction apparatus. As a result, the apparatus will have a very low space factor. As is well understood, the space factor is generally considered the amount of metallic magnetic laminations which are enabled to be provided within the core of the stationary electrical induction apparatus. Where a great amount of interlaminar insulation is required, it will be understood that less magnetic laminations are possible, thereby providing a low space factor. Obviously, the increase in interlaminar insulation with the resulting low space factor will also result in an increase in the cost of the transformer.

It has been discovered that the electromagnetically induced stresses, which are induced in the core during conditions of high impulse voltage are in general only effective for the first few laminations of the laminated magnetic core. It has also been discovered that if additional magnetic material is placed between the coils of the electromagnetic induction apparatus and the magnetic core of such apparatus that the high impulse voltage will be generally absorbed by these few layers of magnetic material and that the impulse voltage will not create electromagnetically induced stresses within the laminations of the core of the stationary electrical induction apparatus.

It is, therefore, an object of this invention to provide a stationary electrical induction apparatus with an improved core and coil structure which will not increase core losses due to high impulse voltage conditions.

It is a further object of this invention to provide an improved core and coil structure in stationary electrical magnetic induction apparatus in which the important laminations of the core are protected from the electromagnetically induced stresses due to high impulse voltage conditions of the coil.

It is a further object of this invention to provide a core and coil structure for an electromagnetic induction apparatus in which a high space factor may be maintained, while at the same time preventing any increase in eddy current losses of the structure, due to high impulse voltage conditions to which the coil may be subjected.

It is well known that the voltage induced between laminations of a magnetic core under a high impulse voltage condition, are composed of both electrostatic and electromagnetic components. It has been recently discovered that although the electrostatically induced voltages can be minimized by proper grounding methods which are well known in the art, that the electromagnetically induced voltages may still be excessive during high impulse test conditions in those portions of the laminations of the magnetic core which are closest to the stressed electrical winding. Therefore, in carrying out this invention in one form, a small number of well insulated magnetic laminations are provided between the coil and the main laminations of the core. The main laminations of the core are provided with the usual interlaminar insulation which is necessary to reduce the eddy current losses of the core. In one preferred embodiment of this invention, the core laminations which are adjacent to the stressed coil windings, are provided with an increased amount of insulation to withstand the electromagnetically induced stresses of the high impulse voltage conditions. This added insulation will be sufficient to prevent any interlaminar failure during such high impulse conditions. Of course, it will be understood that the core will be grounded or such other methods, as is well known to those skilled in the art, will be utilized to prevent excessive electrostatically induced voltages. In another embodiment of this invention, separate magnetic laminations are provided between the coil and the main laminations of the magnetic core, such separate laminations being formed, for example, as part of a coil winding structure. In this embodiment the extra magnetic laminations are placed in the core winding structure so as to absorb all of the electromagnetically induced voltages under the high impulse voltage conditions, and thereby prevent such electromagnetically induced voltages from appearing in the main laminations of the magnetic core.

The features of this invention, which I believe to be novel, will be set forth in particularity in the appended claims. However, the invention itself, both as to its organizations and methods of operation, together with the manner in which the above-mentioned objects as well as other objects and advantages thereof, are obtained, will be best understood by reference to the following description taken in connection with the accompanying drawing in which:

FIG. 8 is a partial view of a core and coil structure showing a second embodiment of the invention; and FIG. 9 is a view taken on the line 9—9 of FIG. 8 showing another detail of this second embodiment of the invention.

Figure 1:
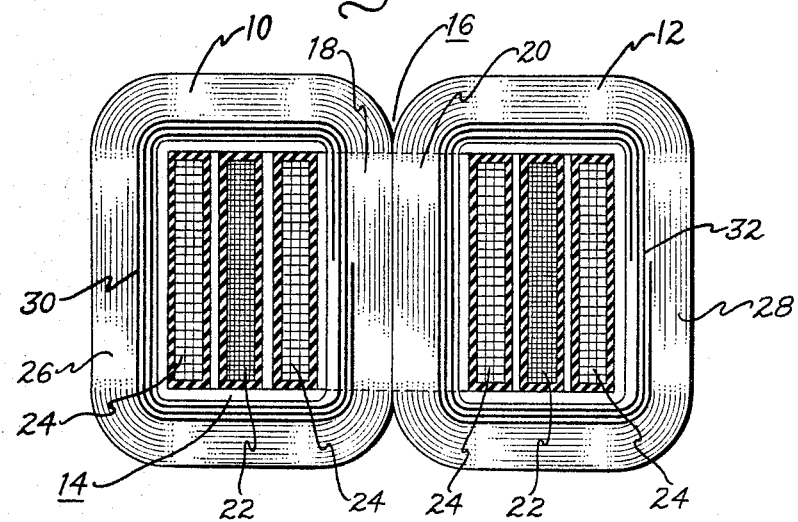
FIG. 1 is a sectional view of one type of coil and core structure showing one embodiment of this invention.

Referring now to the drawings in which like numerals are used to indicate like parts throughout the figures thereof, and in particular with reference to FIG. 1, a single phase transformer core and coil structure is shown. As shown in FIG. 1, the magnetic core is of the curved or bent strip type. By curved or bent strip type of core is meant a laminated core having one or more substantially closed magnetic circuits, each of which comprises a plurality of radially nested magnetic laminations which are curved around the corners of the core and which are ordinarily made of material having a preferred magnetic direction coinciding with their length regardless of whether the cores are formed by winding a long strip of magnetic material or by simultaneously bending to shape a plurality of nested laminations.

As shown in FIG. 1, the core and coil combination comprises two curved cores 10 and 12, which are mounted in side by side relationships. The cores 10 and 12 may be of round or rectangular shape, although as shown in FIG. 1, the rectangular shaped curved core is preferred. The cores 10 and 12 together comprise a three-legged core upon which an electrical winding is mounted. As shown in FIG. 1, the electrical winding, generally indicated as 14, is wound about the central leg of the cores 10 and 12, the central leg generally being indicated as 16, and being comprised of one leg 18 of the core 10 and one leg 20 of the core 12. As indicated, the electrical winding 14 may be comprised of a primary winding section 22, and a pair of secondary sections 24. However, it will be understood that the section 22 could well be a secondary section while sections 24 are utilized as primary coils. Obviously, for the purposes of this invention, it would be immaterial which were considered the primary and which were considered the secondary coils.

Of course, it will be well understood that the electrical windings may take any desired shape. Inasmuch as the core windings are generally considered rectangular, it would be preferred to have rectangular shaped coils utilized. As shown in FIG. 1, the electrical winding 14 and the cores 10 and 12 are mechancially linked with each other. As is well understood in the art, this can be accomplished by lacing the core strips of the cores 10 and 12 through the window opening (not shown) of the electrical windings 14 or, alternatively, could be done by winding the coils on the cores 10 and 12, or, of course, any other method of mechanical linkage which is well known to those skilled in this art.

As pointed out in the beginning of the specification, the laminations of the cores 10 and 12 are each insulated from each other in order to prevent excessive core losses in the form of eddy current losses in the core. There are many well known methods of accomplishing these interlaminar insulations of the laminations of the core. For example, the metallic magnetic material laminations of the core may be separated by layers of laminar strips of insulation which are placed in between each of the separate metallic magnetic laminations of the core material. Another method would be to form an oxide coating on the strips in an oxide coating slurry and then bake the coating thereon. The insulation also could be an oxide of the metallic strip and it may be organic or inorganic. It is only necessary that interlaminar insulation be provided between each of the layers of the metallic magnetic laminations of the core to prevent excessive eddy current losses in the core, as is well known to those skilled in this art.

The eddy current losses which the interlaminar insulation prevents are generally considered to be across the core laminations in a direction which is generally perpendicular to the planes of the various laminations. In order to reduce these eddy current losses, the interlaminar insulation must be able to withstand electrical stresses across the insulation between the laminations, which are induced during the normal operating conditions of the transformer. However, in situations where the electrical windings of the transformer are subjected to high impulse voltage conditions such as during impulse testing of the windings, or during lightning or switching surges, the interlaminar insulation between the metallic magnetic laminations of the core must be sufficiently strong to withstand the electrical stresses which are induced by such high impulse voltage conditions. Where the insulation is not sufficiently strong to withstand these electromagnetically induced stresses, the insulation may be punctured. This puncturing of the insulation results in increased eddy current losses in the core later, during its normal operation at rated voltage and frequencies. As earlier noted, it has been discovered that under transient conditions of excessive electrical stresses of the windings of the transformer, the electromagnetic stresses which are induced in the core are highest at that portion of the core which is closest to the windings which are subject to the high impulse voltage condition. It is, therefore, only necessary to provide additional interlaminar insulation to this portion of the core in order to overcome the electromagnetically induced stresses during high impulse voltage conditions. In the remaining portion of this specification, and in the claims, the terms "main core structure" or "main core section" will be used to indicate that part of the core which has the usual interlaminar insulation between the lamination thereof. The terms "additional laminations" or "adjacent laminations" will be used to indicate those laminations which are provided with additional interlaminar insulation to prevent injury from induced electromagnetic voltages.

For example, considering FIG. 1, when the coil 22 or the coil 24 are subjected to high impulse voltage, the electromagnetically induced stresses across the laminations of the cores 10 and 12 occur primarily in those portions of the cores 10 and 12 which are adjacent to the window opening of the core. As hereinbefore noted, the eddy current losses are across the core laminations in a direction generally perpendicular to their plane. When the high impulse conditions are present in the coils of the core and coil structure, the greatest portion of electromagnetically induced voltages is induced in those portions of the core which have the face of their laminations parallel to the axis of the windings which are subjected to the high impulse voltage conditions. Further, the electromagnetically induced stresses are greatest in such of the laminations as are closest to the windings which are subjected to the high impulse voltages. Therefore, it is possible to prevent most of the interlaminar core insulation failures due to the electromagnetically induced stress conditions by increasing the insulation between the laminations of the portions of the core which are adjacent to the windings. In the embodiment shown in FIG. 1, the magnetic laminations which face or which are parallel to the axis of the windings 14, are the central winding legs 18 and 20 and the opposite legs 26 on core 10 and 28 on core 12. The yokes of each of cores 10 and 12, since they are generally perpendicular to the axis of the winding 14, in general are not subjected to the electromagnetic induced voltage across the laminations and, therefore, it is not necessary that these portions of the core be insulated against such electromagnetically induced stresses.

In the form of the invention shown in FIG. 1, the extra insulation is provided between the laminations of each of the cores 10 and 12 which are closest or most adjacent to the coil winding 14. These adjacent laminations will, of course, be the inner turn laminations of the magnetic cores 10 and 12. In the drawing, the additional insulation for these adjacent laminations of the cores 10 and 12 is shown by the solid lines generally labeled 30 for core 10, and 32 for core 12. The additional interlaminar insulation may be provided by increasing the oxide coating on the inner turns of cores 10 and 12 or by inserting additional insulation between such inner turns, as indicated by numerals 30 and 32. However, in the wound or bent strip cores, rather than merely place the added insulation between the laminations of the core legs which are most adjacent to the coil and which are parallel to the axis of the coil, it has been found more convenient to increase such lamination along the entire length of the inner turns. Therefore, in FIG. 1, the increased insulation 30 on core 10 and 32 on core 12 is shown as being completely around the inner turns of the laminations of the core, rather than merely on the inner turns of legs 18 and 26 of 10, and 20 and 28 of core 12.

Figure 2:
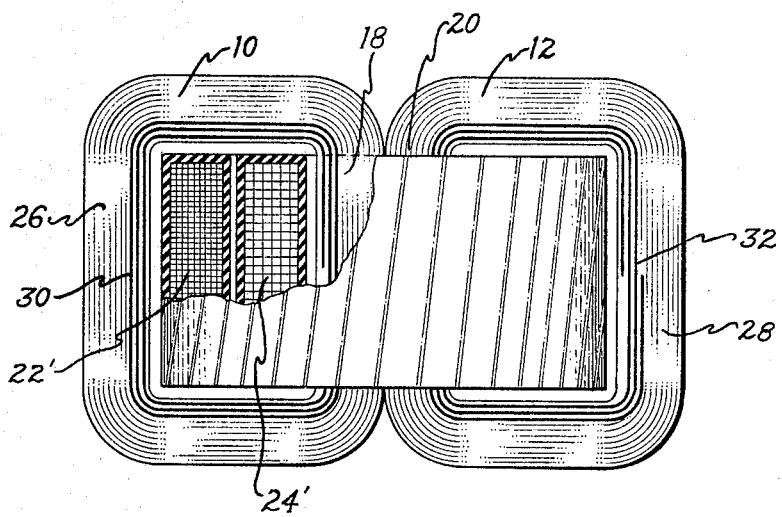
FIG. 2 is a view similar to FIG. 1 showing one form of this invention applied to another type of core and coil structure.

Referring now to FIG. 2, one form of the invention is shown as applied to a core and coil combination in which only two windings are provided about the core; that is, a primary winding 22' and a secondary winding 24'. Of course, it will be readily understood that, for purposes of the invention, it is immaterial which of the two windings 22' and 24' are considered the primary or the secondary winding. As will be readily understood when the inner coil 24' is subjected to a high impulse voltage, the interlaminar electromagnetically induced stresses will be felt predominantly across the adjacent laminations of the leg 18 of the core 10 and the leg 20 of core 12. However, when the outer winding 22' is subjected to high impulse voltage, the electromagnetically induced stresses are primarily induced across the adjacent laminations of leg 26 of core 10, and leg 28 of core 12. Therefore, the added insulation 32 of core 12, and 30 of core 10 is added to the inner laminations of the entire cores 10 and 12 in the same manner as described in reference to FIG. 1.

Figure 3:
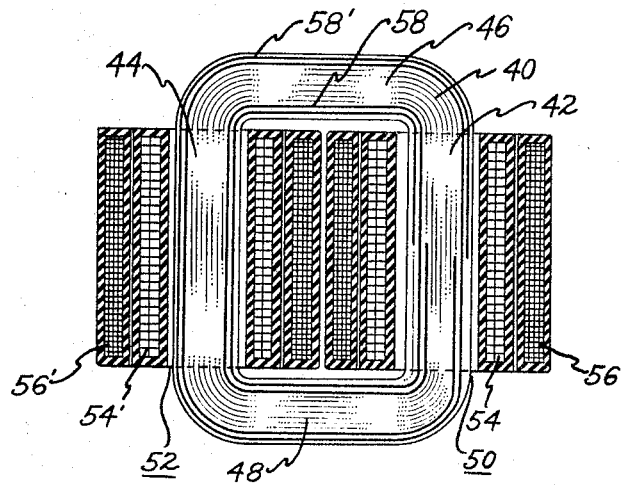
FIG. 3 is a view similar to FIG. 1 showing the invention in one form applied to another type of coil and core structure.

Referring now to FIG. 3 of the invention, the invention in one form as shown as being applied to a single phase transformer in which only a single core loop is provided and electrical windings are applied to each leg of such core loop. As shown in FIG. 3, a single core loop 40 has a pair of winding legs 42 and 44, and a pair of yoke portions 46 and 48. A winding coil 50 is provided on the winding leg 42 while the coil winding 52 is provided on the winding leg 44. Each of the coil windings 50 and 52 are provided with an inner coil or winding 54, 54' and an outer coil or winding 56, 56'. As hereinbefore mentioned with reference to the other figures of this disclosure, it is immaterial for purposes of this invention which of the coils 54, 56 are considered as the primary coil and which of the coils are considered as the secondary coil. When any of the windings are subjected to a high impulse voltage condition, the electrical stresses which are electromagnetically induced in the cores are predominantly experienced across the inner and outer laminations of the core leg on which the stressed winding is present. For example, should the inner coil 54 be subject to high impulse voltage conditions then the inner and outer laminations of the winding leg 42 will be subjected to the electrical stresses which are electromagnetically induced as a result of the high impulse voltage condition. It will be well understood that the outer laminations are subjected to the same electrical stresses due to the electromagnetically induced voltages as are the inner laminations, since each of the outer and inner laminations are equally adjacent to the winding which is subjected to the high impulse voltage condition. This was not true with reference to FIGS. 1 and 2 since in that embodiment the inner laminations of either the inner winding leg or the outer winding leg would be subject to the electromagetically induced stresses, depending upon which of the coils were subjected to the high impulse voltage conditions. In the embodiment shown in FIG. 3, it is necessary to provide additional inter-laminar insulation to both the inner and outer laminations as shown by the dark line indicated at 58 and 58'. As hereinbefore pointed out, the insulation indicated at 58 and 58' is of sufficient strength to withstand the transient stresses which are induced in the inner and outer laminations by means of the electromagnetically induced voltages due to the high impulse voltage conditions. The remaining laminations within the main core structure 40 are provided with the normal insulation in order to prevent eddy currents from forming across such laminations. Since they are not subjected to the high electromagnetically induced voltages, as hereinbefore pointed out, extra insulation is unnecessary.

Figure 4:
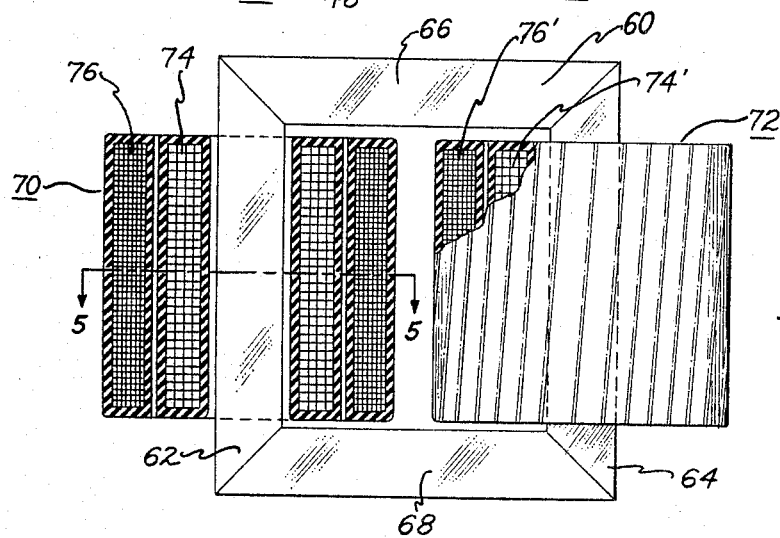
FIG. 4 is an illustration of one form of the invention as applied to another type of coil and core structure.
Figures 5, 5A:
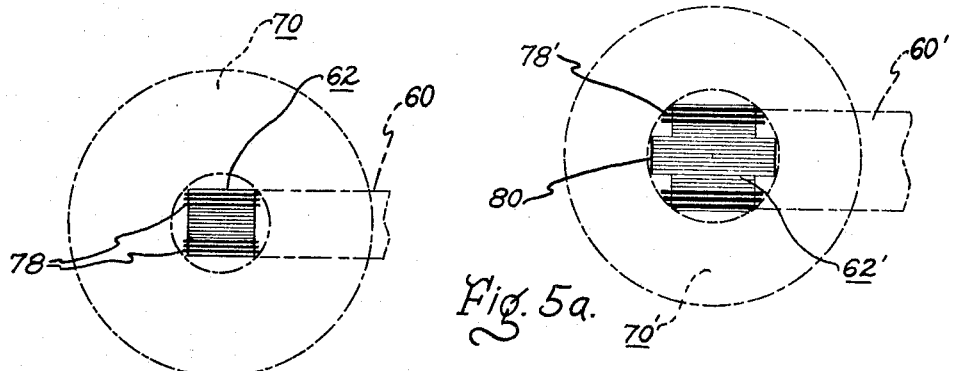
FIG. 5 is a sectional view taken on a line 5—5 of FIG. 4 showing the invention as applied in FIG. 4 in more detail.
FIG. 5a is a modification of FIG. 5 showing the invention applied to a modified form of the core structure of FIG. 4.

Of course, it will be understood that the invention is not restricted to curved core but may also be applied to stacked plate cores such as is specifically shown in FIGS. 4, 5 and 5a. As shown in FIG. 4, a stacked plate core 60, formed with flat laminations, is provided with a pair of winding legs 62 and 64, and a pair of yoke portions 66 and 68. Electrical winding 70 and 72 are provided on each of legs 62 and 64, respectively. Winding 70 is provided with a pair of coils, such as the inner coil 74 and the outer coil 76, while winding 72 has an inner coil 74' and an outer coil 76'. In the form of the core lamination shown in FIG. 4, the laminations are generally coplaner with the plane of the paper; that is, the portion of the winding leg 62 which is shown in the drawing is actually the front face of the outer lamination of the core leg. This is more clearly shown in FIG. 5 and 5a of the drawing in which can be seen the lines that are provided to indicate the laminations making up the core 60. As will be seen from FIG. 5, only the outer laminations on each side of the winding leg 62 are adjacent to the coil winding 70. Therefore, it is only these portions of the winding leg 62 that it is necessary to provide with the additional interlaminar insulation. As shown in FIG. 5, additional interlaminar insulation, generally indicated by the numeral 78, is provided on the outer few adjacent laminations of the winding leg 62 on each side of such winding leg. As hereinbefore noted, this insulation will be sufficiently strong to withstand the electromagnetically induced voltage stresses due to high impulse voltage conditions on the winding 70. It is preferred that the extra laminar insulations 78 extend beyond the edges of the magnetic material laminations so as to insulate the burrs which are formed thereon. As is well known, burrs along the cut edges of core laminations are generally difficult to avoid without considerable expense, so preferably the insulation material is extended over all cuts in all forms of this invention. Where the increased insulation is obtained by increasing the thickness of the oxide coating on the core laminations, this is accomplished by making sure that the increased build in insulation is also obtained along the edges of the core laminations.

In the form of the invention shown generally in FIG. 5a, the core 60' has a cruciform cross-sectional shape. The additional insulation 78' is only placed between the adjacent laminations on each side of the winding leg 62'. It is only necessary to insulate these laminations even though the lamination edges indicated at 80 are much closer to the winding 70' than are the laminations which have the insulation 78' placed therebetween. Inasmuch as the electromagnetically induced stresses are injurious only across the planes of the laminations and are usually induced from the opposite sides of the coil which are coplaner with the laminations, the electromagnetic lines of force which extend radially from the left and right sides of the coil through the core do not result in injurious electromagnetic induced voltage stresses across the planes of the lamination. Therefore, they do not stress the interlaminar insulation in the areas of the edges of the laminations indicated at 80. The induced voltage which may be induced across these laminations, in the general direction of the line 80, that is from top to bottom of the coil 60', would occur across all of the laminations in the vicinity of the edges indicated by line 80. This induced voltage would be across all of the interlaminar insulation between the various laminations making of this portion of the core. This quantity of interlaminar insulation would be sufficient to withstand the electromagnetically induced voltages. Thus, it is only necessary to provide each side of the core leg with the extra interlaminar insulation between the adjacent laminations in which the faces are generally parallel to the surface of the coil and only those laminations which are closest to the core side.

As hereinbefore noted, in the embodiment of the invention shown in FIGS. 4, 5 and 5a, the electromagnetically induced voltage stresses are across the laminations in a direction which is substantially perpendicular to the main plane of the core. In the embodiments of the invention, which were set out in FIGS. 1, 2 and 3, the electromagnetically induced voltage stresses were across the laminations in a direction substantially parallel to the main plane of the core. As will be noted, in each case the additional interlaminar insulation need only be added between those adjacent or additional laminations whose surfaces are parallel to the axis of the windings which are subjected to the high impulse voltage condition and whose surfaces are also closest to such windings. Of course, it will be understood that where the cores are generally circular, the surfaces which face the winding axis will only have a general parallelism to the axis of the winding. However, such surfaces will generally be understood as the ones which require the additional interlaminar insulation rather than the yokes of the core which would extend in a direction generally perpendicular to the winding axis.

Figure 6:
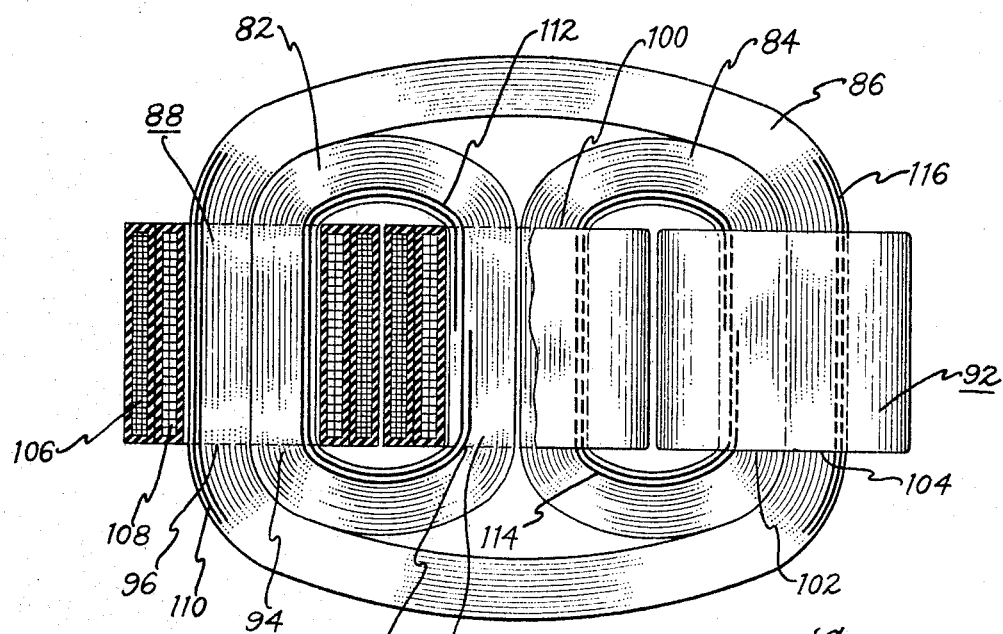
FIG. 6 is a view partially in section of still another type of core and coil structure showing the invention in one form as applied to such structure.

It will be readily understood that this invention is not restricted to single phase transformers, but is equally applicable to a multi-phase transformer. For example, in FIG. 6 a core and coil structure is shown for use in a three-phase transformer. As shown in FIG. 6, the core and coil combination comprises two inner core loops 82 and 84 being surrounded by an outer, larger core loop 86. Electrical windings 88, 90 and 92 are positioned about the various legs of the core in the manner indicated. The electrical winding 88 is wound about the winding leg 94 of core 82 and the winding leg 96 of core 86. The electrical winding 90 is wound about the core winding leg 98 of core 82 and 100 of core 84, while the electrical winding 92 is wound about the winding leg 102 of core 84, and leg 104 of core 86. Each of the electrical windings 88, 90 and 92 may comprise two coil sections such as sections 106 and 108, either section being considered the primary while the other coil section is the secondary. In this form of the invention, the extra insulation will be added to the inner and outer laminations which are within each of the electrical windings; for example, for the winding 88 the interlaminar insulation will be increased in the outer laminations of the core leg 96 of core 86, while the interlaminar insulation of the inner laminations of core leg 94 of winding 82 will be increased. These portions of increased interlaminar insulation are indicated by the heavy lines 110 and 112 respectively. For the electrical winding 90, the interlaminar insulation on the inner laminations of the winding leg 98 of core 82 will be increased while the interlaminar insulation on the inner laminations of the winding leg 100 on the core 84 will be increased. In the same manner, with respect to the winding 92, the interlaminar insulation on the inner lamination of the winding leg 102 of core 84 will be increased, while the interlaminar insulation for the outer lamination of the winding leg 104 of core 86 will be increased. The increased insulation in the inner laminations of the core 82 are indicated by the heavy lines indicated at 112 while the increased insulation on the inner laminations of the core 84 are indicated by the heavy line 114, the outer lamination provided with the additional interlaminar insulation in the outer laminations of the outer winding leg 104 are indicated by the heavy lines 116.

As has been earlier pointed out, it is not necessary that the yoke laminations be provided with additional interlaminar insulation inasmuch as such laminations are not so highly stressed by the electromagnetically induced voltage due to the high impulse voltage conditions to which the windings are subjected. However, with respect to both of the inner cores 82 and 84, it is generally found more convenient to provide the additional interlaminar insulation entirely around the inner adjacent laminations as shown by the lines 112 and 114. However, with respect to the larger outer core 86, inasmuch as only a small portion of the outer laminations, that is, the outer adjacent laminations of the winding legs 96 and 104, are needed to be provided with the additional laminar insulation, it is found more convenient in this instance merely to provide the additional interlaminar insulation at the winding legs in a manner indicated by the line 110 and 116.

Figure 7:
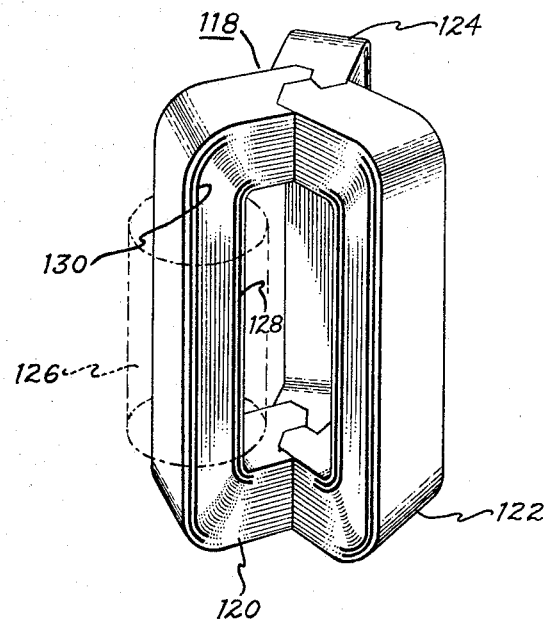
FIG. 7 is an illustration of another type of a core and coil structure with one form of the invention applied thereto.

FIG. 7 provides an illustration of another core and coil structure which may be utilized in a three-phase transformer. In this figure, the core is shown as comprising a three-legged core generally indicated as 118 being provided with legs 120, 122, and 124. Each of the legs is provided with an electrical winding mounted thereon, only one of such windings 126 being indicated in phantom view as being wound upon the leg 120. In this form of core and coil structure it will be understood that the extra interlaminar insulations is required between the inner and outer adjacent laminations on each of the core legs in the manner indicated by the numeral 128, 130. The additional interlaminar insulation on the inner portion of the core leg being indicated as 128 and the additional interlamination between the outer laminations of the core leg being indicated at 130.

The preceding embodiment showing core and coil types in which this invention may be utilized, includes additional interlaminar insulation added between the adjacent or additional laminations of the core leg which are parallel to the axis of the coil winding which is subjected to high impulse voltage conditions and which are most nearly adjacent to such winding. As indicated in the earlier portion of this specification, it is not necessary that the adjacent or additional laminations, which are parallel to the axis of the coil which is subjected to the high impulse voltage condition, be part of the laminations of the core. In FIGS. 8 and 9, another embodiment of the invention is disclosed as applied to a core and coil combination similar to that shown in FIG. 1, which may be utilized in a single-phase transformer. However, it will be understood that this embodiment of the invention could be applied in a similar manner to all of the previous types of core and coil combinations which are set out in FIGS. 1–7.

As shown in FIG. 8, a pair of cores 132, 134 are provided in back to back relationship with the inner leg 136 of core 132, and inner leg 138 of core 134, being adjacent each other. An electrical winding generally indicated as 140, surrounds the two windings legs 136 and 138. The electrical winding 140 may be provided with two coil sections 142 and 144, one such coil section being the primary coil, while the other is the secondary coil. In the embodiment shown in FIGS. 8 and 9, the electrical winding 140 is wound upon a winding form generally indicated at 146. The winding form 146 is generally formed from an electrical insulating material as is well known to those skilled in this art. The novel portion of the invention resides in the addition to the winding form 146 of two or more laminations of metallic magnetic material. Only two such laminations are shown in FIGS. 8 and 9, as indicated at 148 and 150. The winding form 146 is generally shown as a closed rectangular box having a window opening 152 therein, through which the winding legs 136 and 138 of the cores 132 and 134 respectively, may be inserted. As is well known by those skilled in the art, the core legs may be laced through the window opening 152 of the winding form 140, or the core legs may be inserted therein in any other desired manner. The winding 140 is wound about the winding form 146 in any desired manner and the cores are assembled within the window opening 152 to form the desired core and coil combination. Of course, it will be readily understood that the winding form could be of circular cross-section, if desired, rather than rectangular as indicated in FIG. 9, or it may utilize any other shape which is desired.

In forming the coil winding form 146, it is necessary that one or more metallic magnetic laminations be provided on each side of the coil winding form, which will be parallel to the plane of the winding legs of the cores; that is, the winding legs 136 and 138 of the cores 132, 134, respectivley. Of course, additional metallic magnetic laminations will be provided on the opposite side of the coil winding form. Only two such laminations, 154, 156, are shown in FIGS. 8 and 9. In this manner, when the electric winding 140 is subjected to high impulse voltage conditions, the electromagnetically induced voltages will be induced into the adjacent or additional metallic magnetic laminations 148, 150 and 154, 156 and will be absorbed therein without causing undue electromagnetic stresses in the main laminations of the core winding legs 136, 138. In this embodiment of the invention, it is not necessary to provide any additional interlaminar insulation on the inner laminations of the core leg 136 or 138 as previously discussed with reference to FIG. 2 of the drawing, inasmuch as the electromagnetically induced voltages will be expended in the laminations 148, 150 and 154, 156. Of course, the laminations 148, 150 and 154, 156 must be provided with a sufficient amount of insulation material therebetween in order to provide for a substantially complete absorption of the electromagnetically induced voltages. As will be well understood by those skilled in the art, in the normal operation of the core and coil combination shown in FIGS. 8 and 9, the metallic magnetic laminations 148, 150 and 154, 156 will not interfere with such operation of the core and coil combination inasmuch as the laminations do not provide a closed magnetic loop and, therefore, will not interfere with the normally generated fluxes which are utilized in the operation of the core and coil combination, as is well understood in this art.

It will be understood that the drawings are for illustration only and should not be considered as limiting the invention herein set forth. Thus, while only two laminations are shown in the coil winding form 146 of FIGS. 8 and 9, it will be obvious that this is for purposes of illustration only. The number of laminations actually used will depend on the rating of the coil and core combinations as well as the conditions under which it is expected to be used. The criteria to be used to determine the number of laminations necessary are set forth below.

As hereinbefore set forth, it has been discovered that under high impulse voltage conditions, the voltages which are electromagnetically induced in the cores of a core and coil combination, are not distributed evenly across all of the laminations. Under short duration impulse condition, the flux which is induced in the core is induced first in one layer of the core laminations and then into the next layer, and so on through the laminated core. However, since the induced flux, and therefore the induced voltage, are for extremely short duration transient waves, they usually do not extend beyond approximately 5% of the laminations of a conventional power or distribution transformer. These, of course, are the transformers which are generally utilized by electric utilities for the transmitting and distribution of electrical power. In other words, it has been discovered that there is a progressive penetration of the various laminations of the laminated magnetic core. However, by the time the transient waves subside, only those laminations which are adjacent to the electrical winding will have been electromagnetically stressed. Obviously, this is because the impulse voltage conditions generally encountered are of very short duration. For example, in impulse testing of transformers, it is conventional to use impulses whose voltages reach a crest in approximately one and one-half microseconds and subside to one-half their peak value in less than 40 microseconds. Of course, it is extremely difficult to predict the exact wave shape of a lightning or of a switching surge. However, for an impulse which is much steeper and which reaches a crest much sooner, and is of much shorter duration, insulation added in approximately 5% of the core laminations of a 120 volt winding having a 30 kv. BIL would be sufficient. By BIL is meant the basic insulation level specified by NEMA standards. In a similar manner, where equivalent laminations are provided in the coil winding form, the same type of protection will be provided for the core laminations.

It will be understood that the laminations added, apart from the core structure, do not need to be of the same thickness as the laminations in the core structure. Since these laminations do not contribute to the operation of the core structure, and since for voltage waves of short duration there is very little penetration of the magnetic flux into these additional laminations, the additional laminations can be thinner than the core structure if desired.

In referring to 5% of core laminations, it will be understood that this means 5% of all of the core laminations which face a winding surface and which are closer to the winding surface than all of the other core laminations facing the same winding surface. It will be appreciated that the 5% figure is the most severe case and in other ratings the figure will be much less. For example, in a 240 and 600 volt winding having a 30 kv. BIL, 2½% and 1% respectively, would be sufficient. Therefore, in some laminated cores it would be sufficient to use the added insulation in just the first few adjacent or additional laminations. However, the above information is set forth as guides only, and should not be considered as limiting to this invention. Since for wave shapes that have long durations relative to those set forth above, it could be conceivably necessary to specifically insulate as much as 25% of the laminations. However, as noted, this would be an extremely unusual situation and would still provide a substantial savings in terms of the laminations which would not have to be specially insulated.

As hereinbefore noted, there are several ways of applying the invention set forth, herein. For example, insulation may be specially provided for the core laminations which are most nearly adjacent to the winding surface, which is subjected to the high impulse voltage or one or more laminations, which are not part of the main core section may be provided, which are well insulated from each other and which are between the coil winding which is subjected to the high impulse voltage condition and the main body of the core laminations. In providing the insulation between the various core laminations, any of several methods may be used. In normal operating conditions, some laminated cores are provided with 4-40 microns of magnesium silicate coating whereas in other magnetic cores one-third mil of magnesium oxide coating is utilized. The added insulation which is necessary in a 10 KVA transformer within the teaching of this invention, would be approximately one-half mil of Mylar film or sheet, placed between the relevant 5% of the core laminations. In utilizing such added insulation, after impulse tests there was no increase in core losses within the limits of measurable accuracy. However, where the teachings of this invention were not used and depending upon the quality of the normal interlaminar insulation, substantial increases in core losses after impulse testing have been noted.

It will be obvious that this invention is not restricted to the dimensions set forth above, since the thickness of the added insulation will depend upon its quality and upon the stresses it must withstand, as well as the strength of the interlaminar insulation which is already provided under the normal operating conditions of the laminated core. Further, the added insulation is not restricted to sheet or film insulation since it may be provided by increasing the previously indicated magnesium silicate or oxide coating in the core laminations which are closest to the electrical winding which is subjected to the high impulse voltage condition.

While there has been shown and described herein particular embodiments of the invention, it will be obvious to those skilled in this art that many changes and modifications may be made without departing from the spirit and scope of the invention herein before set forth. Therefore it is intended by the appended claims to cover all such changes and modifications as may fall within the true spirit and scope of the invention set forth.

What is claimed as new and which is desired to be secured by Letters Patent of the United States is:

1. An improved core and coil structure for stationary electrical induction apparatus, said core comprising a plurality of strips of laminated magnetic material, said strips being provided with insulation to reduce the eddy current losses of said core, said coil being wrapped around said laminations which form a portion of said core, and a small number of well insulated additional laminations of magnetic material between said coil and the laminations of the core whereby under high induced voltage conditions on the coil, such well insulated additional laminations will withstand the electromagnetically induced stresses.

2. A stationary electrical induction apparatus comprising a laminated magnetic core, an electric coil, said core and coil being provided with means to prevent electromagnetically induced stresses caused by impulse conditions of the coil from puncturing the insulation of said laminated magnetic core, said coil being wound upon a coil form, said coil form being provided with a window opening for insertion of laminated magnetic strips which form said laminated magnetic core, said coil form being provided with a number of well insulated additional magnetic laminations, said additional laminations being placed in said coil form the same direction as said laminated magnetic strips of said laminated magnetic core are inserted in the window opening of said coil form, whereby said insulated additional magnetic laminations provided in said coil form will absorb the electromagnetically induced stresses, thereby preventing the puncturing of the insulation between the laminations of said laminated magnetic core.

3. In a single phase transformer which has two side by side curved laminated magnetic core loops which together comprise a three-legged magnetic core, and an electrical coil surrounding only the central leg of said core, the laminations of each of said core loops being insulated from each other by electrical insulation, said insulation being sufficient to withstand voltage stresses across said laminations due to normal operating conditions in said coil, additional electrical insulation for protecting said first mentioned insulation from puncture by electromagnetically induced voltage stresses across said laminations due to impulse conditions in said coil, said additional insulation being positioned only between the inner laminations of said core loops.

4. In a single phase transformer which has a single curved laminated magnetic core loop and an electrical coil on two of its opposite sides, the laminations of said core loop being insulated from each other by electrical insulation, said electrical insulation being sufficient to withstand voltage stresses across said laminations due to normal operating conditions in said coils, additional electrical insulation between some of said laminations for protecting said first mentioned insulation from puncture by electromagnetically induced voltage stresses across laminations due to impulse conditions in said coils, said additional insulation being positioned only between the inner and outer laminations of said core loop.

5. In a single phase transformer which comprises a closed four sided stacked laminated plate core which has an electrical coil positioned on two of its opposite sides, the laminations of said core being insulated from each other by electrical insulation, said insulation being sufficient to withstand voltage stresses across said laminations due to normal operating conditions in said coils, additional electrical insulation for protecting said first mentioned insulation from puncture by electromagnetically induced voltage stresses across said laminations due to impulse conditions in said coils, said additional insulation being positioned only between the outer laminations of said two sides.

6. In a three phase transformer which comprises two side by side curved laminated magnetic core loops and a third curved laminated magnetic core loop which surrounds said two core loops, said three core loops together comprising a three legged magnetic core and an electrical coil positioned on each of the legs of said core, the laminations of each of said three core loops being insulated from each other by electrical insulation, said insulation being sufficient to withstand voltage stresses across said laminations due to normal operating conditions in said coils, additional electrical insulation for protecting said first mentioned insulation from puncture by electromagnetically induced voltage stresses across said laminations due to impulse conditions in said coils said additional insulation being positioned only between the inner laminations of said two core loops and the outer laminations of said third core loop.

7. In a three phase transformer which comprises a curved laminated magnetic core which has three generally parallel laminated winding legs which are interconnected at their respective opposite ends by generally Y-shaped laminated yoke portions, and an electrical coil on each of said winding legs, the laminations of said core being insulated from each other by electrical insulation, said insulation being sufficient to withstand voltage stresses across said laminations due to normal operating conditions in said coils, additional electrical insulation for protecting said first mentioned insulation from puncture by electromagnetically induced voltage stresses across said laminations due to impulse conditions in said coils, said additional insulation being positioned only between the inner and outer laminations of said winding legs.

References Cited by the Examiner

UNITED STATES PATENTS

| | | | |
|---|---|---|---|
| 2,170,048 | 8/1939 | Dunning et al. | 336—84 X |
| 2,388,848 | 11/1945 | Howe | 336—84 X |
| 2,725,502 | 11/1955 | Chiles et al. | 336—219 X |
| 2,810,868 | 10/1957 | Hodgson | 336—197 X |
| 2,892,169 | 6/1959 | Teague et al. | 336—219 X |
| 2,946,028 | 7/1960 | Anderson et al. | 336—215 X |

LARAMIE E. ASKIN, *Primary Examiner.*

MILTON O. HIRSHFIELD, JOHN F. BURNS,
*Examiners.*

G. H. GERSTMAN, W. M. ASBURY,
*Assistant Examiners.*